(12) United States Patent
Budge

(10) Patent No.: US 10,267,230 B2
(45) Date of Patent: Apr. 23, 2019

(54) APPARATUS AND METHOD FOR CONDITIONING A FLUID

(71) Applicant: ROLLS-ROYCE PLC, London (GB)

(72) Inventor: John R. Budge, Beachwood, OH (US)

(73) Assignee: ROLLS-ROYCE plc, London (GB)

(*) Notice: Subject to any disclaimer, the term of this patent is extended or adjusted under 35 U.S.C. 154(b) by 1081 days.

(21) Appl. No.: 13/771,444

(22) Filed: Feb. 20, 2013

(65) Prior Publication Data
US 2013/0219914 A1  Aug. 29, 2013

Related U.S. Application Data

(60) Provisional application No. 61/603,593, filed on Feb. 27, 2012.

(51) Int. Cl.
| | | |
|---|---|---|
| *B01J 8/02* | (2006.01) | |
| *B01J 8/20* | (2006.01) | |
| *F02C 3/24* | (2006.01) | |
| *C10G 29/16* | (2006.01) | |
| *F02C 3/20* | (2006.01) | |
| *C10G 27/04* | (2006.01) | |
| *C10G 27/10* | (2006.01) | |
| *C10G 75/00* | (2006.01) | |
| *B01J 8/00* | (2006.01) | |
| *C10L 10/04* | (2006.01) | |

(52) U.S. Cl.
CPC ............ *F02C 3/20* (2013.01); *B01J 8/00* (2013.01); *B01J 8/02* (2013.01); *B01J 8/20* (2013.01); *C10G 27/04* (2013.01); *C10G 27/10* (2013.01); *C10G 29/16* (2013.01); *C10G 75/00* (2013.01); *C10L 10/04* (2013.01); *F02C 3/24* (2013.01); *C10G 2400/08* (2013.01)

(58) Field of Classification Search
None
See application file for complete search history.

(56) References Cited

U.S. PATENT DOCUMENTS

| | | | | |
|---|---|---|---|---|
| 1,832,401 A | * | 11/1931 | Lamb ................. | B01D 53/46 423/219 |
| 3,793,185 A | * | 2/1974 | Whitehurst ......... | B01J 20/22 208/251 R |

(Continued)

FOREIGN PATENT DOCUMENTS

| | | | | |
|---|---|---|---|---|
| EP | 1 958 691 A1 | 8/2008 | | |
| GB | 1083691 A | * 9/1967 | ............ | C10G 11/02 |

(Continued)

OTHER PUBLICATIONS

Search Report issued in European Patent Application No. 13 15 5585 dated Aug. 9, 2013.

*Primary Examiner* — Jennifer A Leung
(74) *Attorney, Agent, or Firm* — Oliff PLC

(57) ABSTRACT

A fuel conditioning apparatus for de-oxygenating a liquid hydrocarbon fuel has a catalyst portion which, in turn, has an inlet portion and an outlet portion. A hydrocarbon fuel stream is fed through the inlet portion and into the catalyst portion where it passes over a catalytically active component. The catalytically active component promotes the reaction of the fuel with the dissolved oxygen in the fuel stream, converting it into less chemically reactive forms and thereby reducing the fuel's propensity to form carbonaceous deposits.

13 Claims, 2 Drawing Sheets

(56) References Cited

U.S. PATENT DOCUMENTS

| | | | |
|---|---|---|---|
| 4,655,906 A * | 4/1987 | Bjornson | C10G 45/08 208/112 |
| 4,715,996 A * | 12/1987 | Lambousy | B01F 3/04113 261/114.2 |
| 5,723,403 A * | 3/1998 | Durand | B01J 37/0242 34/58 |
| 6,315,815 B1 | 11/2001 | Spadaccini et al. | |
| 6,939,392 B2 | 9/2005 | Huang et al. | |
| 7,186,328 B1 | 3/2007 | Schultz et al. | |
| 2005/0137441 A1* | 6/2005 | Cordatos | B01D 19/0031 585/818 |
| 2005/0180901 A1* | 8/2005 | Vanderspurt | C10G 27/10 422/211 |
| 2006/0196174 A1* | 9/2006 | Lamm | F23K 5/08 60/288 |
| 2011/0131870 A1 | 6/2011 | Poirier et al. | |

FOREIGN PATENT DOCUMENTS

| | | |
|---|---|---|
| WO | WO 2005/025718 A1 | 3/2005 |
| WO | WO 2013/006527 A1 | 1/2013 |

* cited by examiner

APPARATUS AND METHOD FOR CONDITIONING A FLUID

FIELD OF THE INVENTION

This invention relates to an apparatus and method for conditioning a fuel, and particularly, but not exclusively, to an apparatus and method for deoxygenating a fuel, and more particularly, with reference to liquid hydrocarbon fuels.

BACKGROUND TO THE INVENTION

As the performance demands on modern aircraft increase, there becomes an ever-increasing need for additional cooling of the engine and airframe. Where the aircraft is powered by a gas turbine engine, this cooling function can be achieved by bleeding air from the compressor section of the engine.

However, as aircraft speeds increase, the cooling capacity of this bleed air decreases due to the increase in its stagnation temperature. This combined with the increased cooling requirements of the aircraft at higher speeds, makes the use of bleed air for secondary cooling both less efficient and less practical.

Aviation fuels, in addition to their primary use as a propellant, are often used as a coolant for the engine lubricants and environmental control and avionics systems in aircraft. This increases the thermal loads experienced by aviation fuels, with these thermal loads being anticipated to rise with the requirements of advanced aircraft.

As a result, the thermal stability of aviation fuels is becoming increasingly important to the design of high performance aircraft systems.

It is well known that the exposure of hydrocarbon based fuels to elevated temperatures may result in oxidative degradation ("auto-oxidation") and producing insoluble products in the bulk liquid as well as forming deposits on fuel washed surfaces. Such insoluble products and deposits can result in reduction in heat exchanger efficiencies as well as causing obstructions in flow components such as fuel injectors, pipes, filters and valves.

One approach to reducing the vulnerability of a hydrocarbon fuel to auto-oxidation and thereby to improve its thermal stability is the addition of additive compounds to the fuel. Fuel additives, while effective, increase the cost of the fuel and cause logistical problems insofar as the fuel additive must be distributed and blended with the fuel before use.

A major factor which adversely affects a hydrocarbon fuel's thermal stability is the quantity of dissolved oxygen in the fuel. Due to the fuel's affinity for oxygen, the exposure of the fuel to the atmosphere can result in the absorption of oxygen by the fuel.

A known technique for removing dissolved oxygen from, or de-oxygenating, a fuel involves a membrane separator, or molecular filter. This consists of an ultra-thin membrane layered with a micro-porous polymer support that provides strength.

The membrane separation technique while effective requires dedicated hardware and control mechanisms which add to the complexity and weight of the aircraft.

STATEMENTS OF INVENTION

According to a first aspect of the present invention there is provided a method for conditioning a liquid hydrocarbon fuel, the fuel comprising a quantity of dissolved oxygen, the method comprising the step of:

(i) flowing a volume of the fuel through a catalyst system, wherein the catalyst system is capable of promoting the reaction of at least some of the dissolved oxygen with the fuel, thereby reducing the quantity of dissolved oxygen.

By simply flowing the fuel through a catalyst, the method of the present invention is inherently simpler and less complex than conventional membrane or sparging de-oxygenation methods. This in turn enables the system required to implement the method to be smaller in size than that required by conventional de-oxygenation methods, such as membrane separation techniques.

The catalyst system may comprise an oxidation catalyst.

Catalyst compositions suitable for use are not particularly limited so long as the catalyst composition promotes the reaction of some or all of the dissolved oxygen with the fuel to form more stable compounds.

The catalyst system may include a catalytically active component which is selected from Groups 1 to 15 as defined in the IUPAC periodic table.

The term catalytically active is used in this context to refer to a catalyst composition which is able to promote the reaction of dissolved oxygen with the hydrocarbon fuel. This catalyst composition may also promote the conversion of other reactive oxygen-containing compounds (such as, for example, peroxides and hydroperoxides) in the fuel into less reactive forms.

In this context, the reference to the IUPAC periodic table is understood to refer to the periodic table classification which was introduced by the International Union of Pure and Applied Chemistry (IUPAC) in 1985. In this classification scheme the groups of the periodic table are numbered incrementally increasing from left to right (i.e. from Group 1 at the leftmost end to Group 18 at the rightmost end).

The catalytically active component may include at least one metal selected from Groups 8 to 10 of the IUPAC periodic table.

The catalytically active component may include at least one metal oxide selected from the group comprising vanadium oxide, iron oxide, cobalt oxide, aluminium oxide, magnesium oxide, zinc oxide, cerium oxide, lanthanum oxide, ruthenium oxide, palladium oxide, and platinum oxide.

The preferred catalytically active components are known to have oxidative catalytic properties. In addition, the preferred catalytically active components are effective for the decomposition of peroxy compounds that are known reactive intermediates contributing to the formation of carbonaceous deposits.

In one embodiment of the invention, the catalytically active components may comprise at least one amphoteric metal oxide, i.e. the metal oxide may act as either an acid or a base (in the Bronsted-Lowry (i.e. proton) or Lewis (i.e. electron) sense). Such amphoteric metal oxides may activate the molecular oxygenation for reaction with the fuel. These amphoteric metal oxides may also facilitate the decomposition of the reactive intermediates, such as peroxides, that are responsible for the formation of carbonaceous deposits.

The auto-oxidation chemistry is complex and involves the reaction of the hydrocarbon fuel (RH) with dissolved oxygen ($O_2$) to form free radical species (R.) in a series of initiation and chain reactions. Equations (1) to (4) are illustrative examples of possible radical initiation and propagation reactions involving peroxy (ROO.) and hydroperoxide (ROOH) intermediates.

$$RH + O_2 \rightarrow R\cdot + HOO\cdot \quad (1)$$

$$R\cdot + O_2 \rightarrow ROO\cdot \quad (2)$$

$$ROO\cdot + R'\cdot \rightarrow RR'OOH \quad (3)$$

$$R\cdot + R'OOH \rightarrow RR' + HOO\cdot \quad (4)$$

While not wanting to be bound by theory, it is believed that the catalysts of this invention disrupt the radical chain reactions leading to the formation of the higher molecular weight carbonaceous deposits by converting the reactive peroxy and hydroperoxide intermediates to more stable oxygenated products:

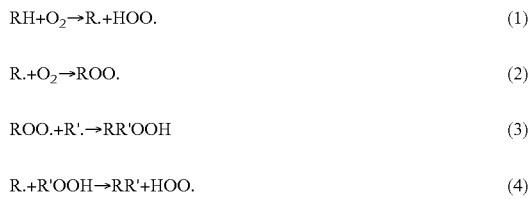

$$RCH_2OOH \rightarrow RCHO + H_2O \quad (5)$$

$$RCH_2OO\cdot + RCH_2\cdot \rightarrow RCHO + RCH_2OH \quad (6)$$

The fuel volume may be metered into the catalyst at a pre-determined volumetric flow rate.

For any given catalyst configuration there will be an upper limit to the flow rate of the fuel passing through the catalyst, if all of the dissolved oxygen in the fuel is to react with the catalyst into a less reactive form.

In order to optimise the performance of the catalyst, the fuel flow rate will ideally be constant. This fuel flow rate will have a value less than or equal to the upper limit to the flow rate of the fuel passing through the catalyst.

The volumetric flow of the fuel may have a space velocity in the range of 50 to 500 h$^{-1}$.

The term space velocity is understood to be defined as follows.

It may be advantageous for the method to use a high space velocity because this will reduce the size and complexity of the process equipment.

In one embodiment of the invention the space velocity of the fuel flow may range from 1 to 1000 hr$^{-1}$. In an alternative embodiment, the fuel flow may have a space velocity in the range of 50 to 500 hr$^{-1}$.

The method may include the additional initial step of:
(i') heating the fuel to a temperature greater than 40° C.
The method may include the additional initial step of:
(i') heating the fuel to a temperature greater than 100° C.
In one embodiment of the invention, the method may be carried out at an elevated temperature. In this context, the term 'elevated' refers to a temperature which is elevated relative to the corresponding ambient temperature.

Operation of the method at a temperature greater than 40° C. improves the efficiency of the catalytic conversion process, relative to its operation at ambient temperature.

Operation of the method at a temperature greater than 100° C. may further improve the efficiency of the catalytic conversion process, relative to its operation at ambient temperature.

At elevated temperatures, the pressure within the fuel system should be sufficient to maintain the fuel in its liquid phase.

While there is no fixed upper limit on the temperature of operation of the method, this temperature should be less than the thermal stability limit of the fuel in order to avoid the formation of solid materials in the fuel and/or deposition of solid material on the catalyst or other surfaces in the system or downstream of the system.

The method may include the additional step of:
(ii) communicating the fuel to an energy conversion device, such as a gas turbine engine; and
(iii) combusting the fuel in the energy conversion device.

The performance of an energy conversion device, such as a gas turbine, may be improved by combusting a de-oxygenated fuel in the device. This improvement may manifest itself in the form of a reduction of fuel fouling in the device.

The method may include the additional step of:
(ii) communicating the fuel to a fuel processing system for the generation of hydrogen or synthesis gas.

A typical fuel processing system may comprise a fuel vapouriser, a desulphuriser, a reformer (steam, catalytic/non-catalytic partial oxidation or autothermal), a water-gas-shift unit and a hydrogen purification unit (membrane or pressure swing). The use of a method of conditioning the fuel may improve the performance of the fuel processing system by reducing fouling in the fuel processor.

The method may include the additional step of:
(iii) communicating the hydrogen or synthesis gas stream to a fuel cell for the generation of electricity.

The method may include the additional steps of:
(ii) transferring heat from a heat-generating system to the fuel; and
(iii) communicating the fuel to an energy conversion device, such as a gas turbine engine.

The method of the present invention, by conditioning the fuel, reduces the dissolved oxygen content of the fuel which thereby increases the fuel's thermal stability limit. As mentioned above, an increase in the thermal stability limit of the fuel increases its heat sink capacity.

The stabilised, de-oxygenated fuel may then be used to cool hot air streams from various aircraft sub-systems. This cooled air stream may then, in turn, be used to cool other aircraft components in preference to use of secondary liquid cooling circuits. This can increase the energy efficiency of the aircraft by eliminating the requirements for secondary cooling system(s) and hardware.

According to a second aspect of the present invention there is provided a method of transferring thermal energy from a sub-system of an aircraft, the aircraft having at least one gas turbine engine, the gas turbine engine being supplied with a liquid hydrocarbon fuel, the fuel comprising a quantity of dissolved oxygen, the method comprising the steps of:
(i) flowing a volume of the fuel through a catalyst system, wherein the catalyst system is capable of promoting the reaction of at least some of the dissolved oxygen with the fuel, thereby reducing the quantity of dissolved oxygen;
(ii) transferring thermal energy from the sub-system to the fuel that has a reduced quantity of dissolved oxygen; and
(iii) combusting the fuel that has increased thermal energy in the at least one gas turbine engine.

The use of a liquid hydrocarbon fuel, which is already carried on an aircraft to power the aircraft engines, to transfer thermal energy away from an aircraft sub-system eliminates the need for an additional cooling medium. This makes the aircraft's thermal energy transfer systems simpler and therefore less costly and more compact.

In addition, transferring thermal energy to the hydrocarbon fuel before it is combusted in the aircraft's engine(s) increases the combustion efficiency of the engine(s).

According to a third aspect of the present invention there is provided an apparatus for conditioning a liquid hydrocarbon fuel, the fuel comprising a quantity of dissolved oxygen, the apparatus comprising:

a housing, comprising:
an inlet portion;
a catalyst portion; and
an outlet portion,
the inlet and outlet portions each being in respective fluid communication with the catalyst portion, and
the catalyst portion has a catalytic surface configured to promote the reaction of at least some of the dissolved oxygen with the fuel, to thereby reduce the quantity of dissolved oxygen.

The housing may include a heating means configured to increase the temperature of the fuel entering the catalyst portion to a temperature greater than 40° C.

The housing may include a heating means configured to increase the temperature of the fuel entering the catalyst portion to a temperature greater than 100° C.

The catalyst portion may include an oxidation catalyst.

The catalyst portion may include a catalytically active component being selected from Groups 1 to 15 as defined in the IUPAC periodic table.

The catalytically active component may include at least one metal oxide selected from the group comprising vanadium oxide, iron oxide, cobalt oxide, aluminium oxide, magnesium oxide, zinc oxide, cerium oxide, lanthanum oxide, ruthenium oxide, palladium oxide, and platinum oxide.

The catalyst portion may include a slurry bed reactor.

In one embodiment of the invention, the catalyst portion takes the form of a slurry bed reactor in which fine catalyst particles are suspended in the fuel.

The catalyst portion may include a fixed bed reactor.

In a fixed-bed reactor the catalyst pellets is retained in place and does not move with respect to a fixed reference frame.

The catalytically active metals and/or metal oxides are most suitably dispersed on a carrier. Suitable carriers are well known in the art and include activated carbon and refractory metal oxides such as silica, alumina, titania, and mixtures thereof.

The carrier materials may have surface areas ranging from approximately 0.05 $m^2/g$ to 1500 $m^2/g$.

The catalyst may comprise the catalytically active metals and/or metal oxides in any suitable amount to achieve the required level of conversion. Typically, the catalyst comprises the catalytically active components in an amount ranging from 0.01 to 30% by weight, and preferably from 1 to 10% by weight.

In this context, the term % by weight of the catalytically active component is understood to refer to the percentage of the total weight of the catalyst which corresponds to the catalytically active component.

The catalysts may conveniently be pressed or extruded into pellets or other three dimensional shapes for use in a fixed bed reaction regime.

The fixed bed reactor may include a porous monolithic structure through which the volumetric flow of fuel passes, the monolithic structure being selected from the group comprising metal monoliths, refractory oxide monoliths, metallic foams and ceramic foams.

An advantage of using a porous monolithic structure as a foundation for the catalyst is the high surface area/volume ratio of such a structure.

The catalytically active component may be deposited onto the surface of the porous monolithic structure.

By depositing the catalyst onto the surface of the porous monolithic structure, the catalyst assembly may be made more compact. This makes the apparatus smaller and easier to accommodate with the aircraft.

The apparatus may include a pump means which is configured to provide a volumetric flow of the fuel through the housing at a space velocity in the range of 50 to 500 $hr^{-1}$.

In one embodiment of the invention the space velocity of the fuel flow may range from 1 to 1000 $hr^{-1}$. In an alternative embodiment, the fuel flow may have a space velocity in the range of 50 to 500 $hr^{-1}$.

The catalyst may have a surface area determined to react at least some of the oxygen dissolved in the fuel, with the fuel itself, at a rate commensurate with the space velocity of the fuel.

In one embodiment of the invention, the surface area of the catalyst is sized such that when the fuel flows across the catalyst at the working space velocity, substantially all the fuel is allowed to react with the catalyst. This ensures that substantially all of the dissolved oxygen in the fuel is reacts with the catalyst to form one or more less reactive compounds.

BRIEF DESCRIPTION OF THE DRAWINGS

There now follows a description of an embodiment of the invention, by way of non-limiting example, with reference being made to the accompanying drawings in which.

DETAILED DESCRIPTION

Various hydrocarbon liquids are commonly used as fuels for internal combustion engines such as, for example, gas turbine engines. When exposed to air, most hydrocarbon liquids will absorb oxygen into solution in the liquid.

This dissolved molecular oxygen, while not being part of the chemical composition of the hydrocarbon liquid, is a significant factor contributing to a fuel's thermal stability. The absorbed oxygen readily reacts with the fuel at elevated temperatures to generate free-radical chemical species that lead to the formation of thermal-oxidative deposits which can adversely affect the performance of the fuel system.

Figure 1:
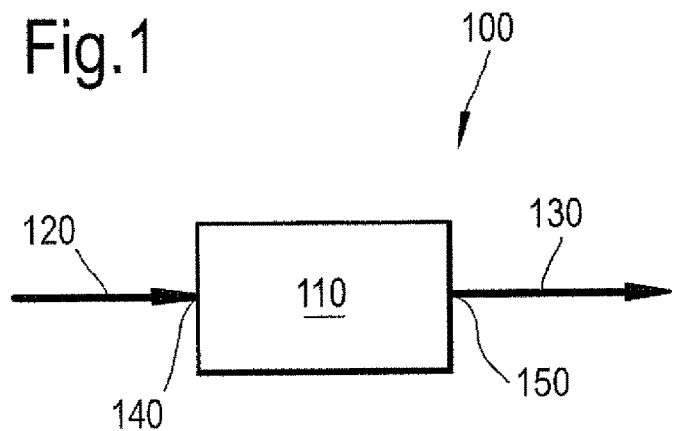
FIG. 1 shows a schematic arrangement of a fuel conditioning apparatus according to a second embodiment of the invention.

In a first embodiment of the invention, shown schematically in FIG. 1, a volume of a hydrocarbon fuel 120 having a quantity of dissolved oxygen is passed through a catalyst system 110.

The catalyst system 110 comprises a catalytically active component (not shown) which is capable of promoting the reaction of at least some of the dissolved oxygen in the fuel 120 with the fuel 120 itself. As a result, the conditioned flow of fuel 130 has a lower quantity of dissolved oxygen than the unconditioned flow of fuel 120.

According to a second embodiment of the invention a fuel conditioning apparatus (see FIG. 1) is designated generally by the reference numeral 100. The fuel conditioning apparatus 100 is intended for use in, for example, an unmanned autonomous aircraft.

The fuel conditioning apparatus 100 comprises a catalyst portion 110 having an inlet portion 140 and an outlet portion 150.

In the first embodiment, the catalyst portion 110 comprises a metallic substrate 160 onto the surface of which has been deposited a catalytically active component (not shown). The metallic substrate 160 is formed with a spiral arrangement of interleaved flat metal sheets 162 and corrugated metal sheets 164.

In this embodiment of the invention, the catalytically active component comprises iron and/or vanadium oxides deposited as a coating 180 on the surface of the metallic substrate 160.

In other embodiments of the invention, the catalyst coating 180 on the surface of the metallic substrate 160 comprises at least one metal selected from Groups 8 to 10 of the IUPAC periodic table, and/or at least one metal oxide from the group comprising vanadium oxide, iron oxide, cobalt oxide, aluminium oxide, magnesium oxide, zinc oxide, cerium oxide, lanthanum oxide, ruthenium oxide, palladium oxide, and platinum oxide.

In another embodiment of the invention, the catalyst portion 110 comprises catalyst pellets with the catalytically active component comprising at least one metal selected from Groups 8 to 10 of the IUPAC periodic table. The, catalytically active component may comprise at least one metal oxide from the group comprising vanadium oxide, iron oxide, cobalt oxide, aluminium oxide, magnesium oxide, zinc oxide, cerium oxide, lanthanum oxide, ruthenium oxide, palladium oxide, and platinum oxide.

In use, the hydrocarbon fuel which is to be conditioned is fed as a fuel stream 120 through the inlet portion 140 and into the catalyst portion 110.

The fuel stream 120 may be fed into the catalyst portion 110 by any suitable means, such as, for example, an electric pump (not shown).

The fuel stream 120 then passes over the catalyst which promotes the reaction of dissolved oxygen with the fuel to form less chemically reactive species and thereby reduces the fuel's propensity to form carbonaceous deposits.

The flow rate of the fuel flowing into the catalyst portion 110 may be selected such that the duration for which the fuel is in contact with the catalytically active component (defined as the 'residence time') is sufficient for substantially all of the dissolved oxygen in the fuel to be converted to a less reactive form.

In this embodiment, the space velocity of the fuel entering the catalyst portion 110 is approximately 300 hr$^{-1}$. In other embodiments, the space velocity may be within the range of 1 to 1000 hr$^{-1}$.

The fuel conditioning apparatus 100 may be operated at ambient pressure, as in the present embodiment. Alternatively, the apparatus 100 may be operated at an elevated pressure.

After passing over the catalytically active component, the conditioned (or de-oxygenated) fuel stream 130 exits the catalyst portion 110 through the exit portion 150.

The de-oxygenated fuel stream 130 may then be used in a fuel-to-air heat exchanger to absorb thermal energy from a hot air stream generated elsewhere within the aircraft.

Figure 2:
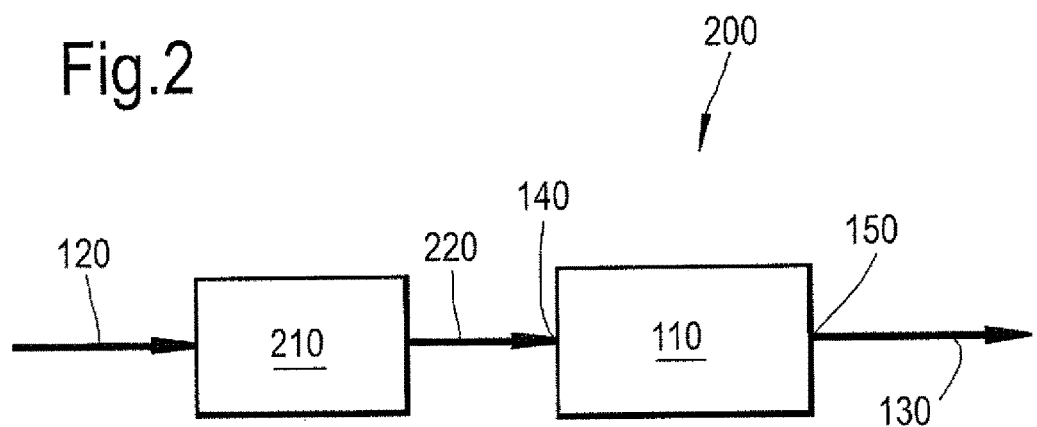
FIG. 2 shows a schematic arrangement of a fuel conditioning apparatus according to a third embodiment of the invention.
Figure 3:
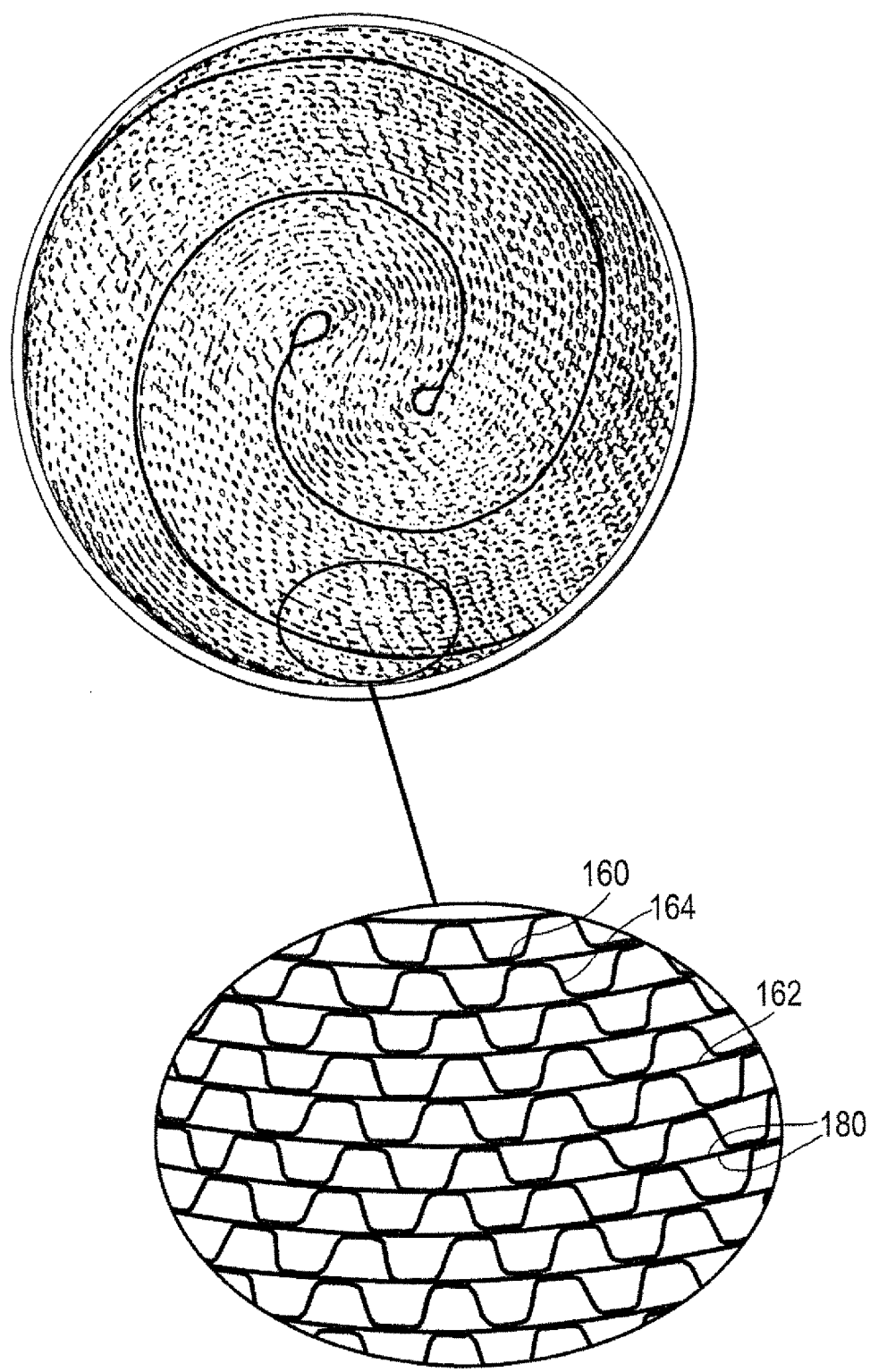
FIG. 3 shows a schematic cross sectional view through a catalyst portion of the apparatus of FIGS. 1 and 2.

Referring to FIG. 2, a fuel conditioning apparatus according to a third embodiment of the invention is designated generally by the reference numeral 200. Features of the apparatus 200 which correspond to those of apparatus 100 have been given corresponding reference numerals for ease of reference.

The fuel conditioning apparatus 200 comprises a catalyst portion 110 having an inlet portion 140 and an outlet portion 150, and a heater 210 positioned upstream of the inlet portion 140.

In use, the fuel stream 120 passes through the heater 210 which is configured to raise the temperature of the fuel stream 220 as it enters the inlet portion 140 to approximately 110° C.

The catalyst portion 110 of the second embodiment operates in exactly the same manner as for the first embodiment.

The present invention may be embodied in other specific forms without departing from its spirit or essential characteristics. The described embodiments are to be considered in all respects only as illustrative and not restrictive. The scope of the invention is therefore indicated by the appended claims rather than by the foregoing description. All changes which come within the meaning and range of equivalency of the claims are to be embraced within their scope.

What is claimed is:

1. An apparatus for conditioning a liquid hydrocarbon fuel, the liquid hydrocarbon fuel comprising a quantity of dissolved oxygen, the apparatus comprising:
   a housing, having:
      an inlet portion;
      an outlet portion; and
      a catalyst portion in fluid communication with the inlet and outlet portions, the catalyst portion having a catalyst surface coated only with one or more metal oxides selected from the group consisting of vanadium oxide, iron oxide, cobalt oxide, aluminium oxide, magnesium oxide, zinc oxide, cerium oxide, lanthanum oxide, ruthenium oxide, palladium oxide, and platinum oxide; and
   a pump configured to provide a volumetric flow of the liquid hydrocarbon fuel through the housing at a space velocity of approximately 300 hr$^{-1}$,
   wherein the catalytic surface is configured to promote a reaction of at least some of the dissolved oxygen with the liquid hydrocarbon fuel,
   whereby peroxy and hydroperoxide intermediate products of the reaction are converted to more stable oxygenated products, to thereby reduce the quantity of dissolved oxygen.

2. The apparatus as claimed in claim 1, wherein the housing further comprises a heater configured to increase the temperature of the liquid hydrocarbon fuel entering the catalyst portion to a temperature greater than 40° C.

3. The apparatus as claimed in claim 1, wherein the housing further comprises a heater configured to increase the temperature of the liquid hydrocarbon fuel entering the catalyst portion to a temperature greater than 100° C.

4. The apparatus as claimed in claim 1, wherein the catalyst portion further comprises a slurry bed reactor.

5. The apparatus as claimed in claim 1, wherein the catalyst portion further comprises a fixed bed reactor.

6. The apparatus as claimed in claim 5, wherein the fixed bed reactor comprises a porous monolithic structure through which the volumetric flow of fuel passes, the monolithic structure being selected from the group consisting of: metal monoliths, refractory oxide monoliths, metallic foams and ceramic foams.

7. The apparatus as claimed in claim 6, wherein the one or more metal oxides are deposited onto the surface of the porous monolithic structure.

8. The apparatus as claimed in claim 1, wherein the catalytic surface comprises a surface area determined to react at least some of the oxygen dissolved in the liquid hydrocarbon fuel, with the fuel itself, at a rate commensurate with the space velocity of the fuel.

9. A method for conditioning a liquid hydrocarbon fuel, the fuel comprising a quantity of dissolved oxygen, the method comprising the step of:
   (i) flowing a volume of the fuel through the apparatus according to claim 1, thereby reducing the quantity of dissolved oxygen.

10. The method as claimed in claim 9, wherein the volumetric flow of the fuel has a space velocity of approximately 300 hr$^{-1}$.

11. The method as claimed in claim 9, the method comprising the additional initial step of:
   (i') heating the fuel to a temperature greater than 40° C.

12. The method as claimed in claim 9, the method comprising the additional initial step of:
   (i') heating the fuel to a temperature greater than 100° C.

13. A method of transferring thermal energy from a sub-system of an aircraft, the aircraft having at least one gas turbine engine, the gas turbine engine being supplied with a liquid hydrocarbon fuel, the fuel comprising a quantity of dissolved oxygen, the method comprising the steps of:
   (i) flowing a volume of the fuel through the apparatus according to claim 1, thereby reducing the quantity of dissolved oxygen;
   (ii) transferring thermal energy from the sub-system to the fuel that has a reduced quantity of dissolved oxygen; and
   (iii) combusting the fuel that has increased thermal energy in the at least one gas turbine engine.

* * * * *